United States Patent [19]

Sadek et al.

[11] Patent Number: 5,308,665
[45] Date of Patent: May 3, 1994

[54] IMPURITY SCAVENGER PILLOW

[75] Inventors: Paul Sadek, Grand Rapids; Jim Pyzybytek, Fruitport; James Westra, N. Muskegon, all of Mich.

[73] Assignee: Baxter Diagnostics Inc., Deerfield, Ill.

[21] Appl. No.: 617,310

[22] Filed: Nov. 16, 1990

Related U.S. Application Data

[63] Continuation of Ser. No. 478,056, Feb. 7, 1990, abandoned, which is a continuation of Ser. No. 316,747, Feb. 28, 1989, abandoned.

[51] Int. Cl.$^5$ .............................................. B01D 50/00
[52] U.S. Cl. .................................... 428/35.2; 206/204;
428/35.4; 428/35.5; 428/68; 428/76; 428/35.7; 428/121; 428/131; 428/913
[58] Field of Search ................ 428/35.2, 35.4, 35.5, 428/76, 68, 121, 131, 913, 35.7; 206/204; 426/124; 55/387, 389

[56] References Cited

U.S. PATENT DOCUMENTS

| | | | |
|---|---|---|---|
| 1,252,872 | 8/1918 | Yoggerst et al. | 55/387 |
| 2,536,274 | 1/1951 | Gaugler | 206/204 |
| 2,638,179 | 5/1953 | Yard | 206/204 |
| 2,789,369 | 4/1957 | Walker | 55/387 |
| 3,820,309 | 6/1974 | Cullen et al. | 55/387 |
| 3,911,080 | 10/1975 | Mehl et al. | 423/210 |
| 3,990,872 | 11/1976 | Cullen | 206/204 |
| 4,061,807 | 12/1977 | Shaler | 428/36.4 |
| 4,256,773 | 3/1981 | Hoga et al. | 421/415 |
| 4,332,845 | 6/1982 | Nawata et al. | 206/204 |
| 4,337,276 | 6/1982 | Nakamura et al. | 426/118 |
| 4,383,376 | 5/1983 | Numamoto et al. | 428/474.7 |
| 4,552,752 | 11/1985 | Amick | 206/0.5 |
| 4,585,505 | 5/1986 | Walley et al. | 206/204 |
| 4,686,776 | 8/1987 | Matsubara | 206/204 |
| 4,749,392 | 6/1988 | Aoki et al. | 55/387 |
| 4,756,726 | 7/1988 | Peace | 55/387 |
| 4,770,678 | 9/1988 | Hasletti, Jr. | 55/387 |
| 4,772,300 | 9/1988 | Cullen | 55/274 |
| 4,783,206 | 11/1988 | Cullen et al. | 206/204 |
| 4,830,643 | 5/1989 | Sassa et al. | 55/389 |

OTHER PUBLICATIONS

Trap-Pak-MilliGen/Biosearch—Div. of Millipore.

*Primary Examiner*—A. A. Turner
*Attorney, Agent, or Firm*—Mark J. Buonaiuto; Paul C. Flattery

[57] ABSTRACT

An impurity scavenger pillow or capsule and method for removing water or keeping water levels low in a solvent container with minimal particulate or chemical contamination, comprising a pillow consisting essentially of a porous bag containing a desiccant material, said pillow being formed through folding and sealing adjacent layers of the bag or comprising a capsule consisting essentially of a solid cylinder with the end or ends being a porous material.

5 Claims, 1 Drawing Sheet

IMPURITY SCAVENGER PILLOW

This is a continuation of application Ser. No. 07/478,056, filed on Feb. 7, 1990, now abandoned, which is a continuation of application Ser. No. 07/316,747, filed on Feb. 28, 1989, now abandoned.

BACKGROUND OF THE INVENTION

Field of the Invention

This invention relates to a small pillow or capsule which can be placed into reagent or high purity solvent in a container. In particular, this invention relates to a means to keep water content low in solvents used in biotechnology instrumentation such as DNA or protein synthesizers.

Many patents disclose devices for drying materials in a container or for removing moisture. U.S. Pat. No. 1,252,872 (Device for Drying Salt in Shakers or Other Receptacles), U.S. Pat. No. 2,536,274 (Desiccant Cartridge and Method of Making), U.S. Pat. No. 2,789,369 (Desiccant Package), U.S. Pat. No. 2,638,179 (Drying Package), U.S. Pat. No. 3,990,872 (Adsorbent Package), U.S. Pat. No. 4,061,807 (Adsorbent Body and Method for Making Same), U.S. Pat. No. 4,588,505 (water scavenger pouch having an open mesh hydrocarbon containing a water absorbent polymer phase), U.S. Pat. No. 4,383,376 (discloses contact dehydrating sheet for use in production of dried-containing food such as fish), U.S. Pat. No. 4,686,776 (Dehydrating Device), U.S. Pat. No. 4,772,330 and U.S. Pat. No. 4,783,206 (discloses an absorbent cartridge used with a container of pills. The cartridge is filled with an adsorbent which will adsorb moisture, odor or gases). One patent, U.S. Pat. No. 4,770,678, discloses an apparatus to remove moisture from a natural gas stream.

SUMMARY OF THE INVENTION

The invention is a small pillow or capsule which can be placed into a container of reagent or high purity solvent. It consists of an active, solid material such as molecular sieves or an immobilized reagent on a solid support such as glass beads. The solid material is effectively contained either within a pillow made by folding over and heat sealing a flexible membrane material or within a capsule with ends or sides which are fine filter membranes. The pillow design allows a maximum available surface area so the solvent may readily come into contact with the solid inside the pillow, thereby, removing certain solvent impurities which react with or are absorbed by the solid material. The membrane prevents fine particulates in the solid support from contaminating the bulk of the solvent. A membrane with an outer teflon surface also offers minimal contamination of the solvent with extractable components of the membrane. The size of the pillow or capsule would depend on the size of the container being protected and would be small enough to fit through the container opening. It could be used in small vials or bottles or in larger 1-liter or 4-liter bottles or even in cans or drums.

This approach is valuable and unique, especially where solvents can be contaminated after packaging, such as by absorption of water from the atmosphere or internal generation of peroxides or other decomposition products.

One other important feature of the impurity scavenger pillow or capsule is that it offers very minimal particulate or chemical contamination to a number of different solvents while doing an effective job of removing water or keeping water levels low. The devices also act fairly rapidly.

DETAILED DESCRIPTION—BEST MODE

Figure 1:
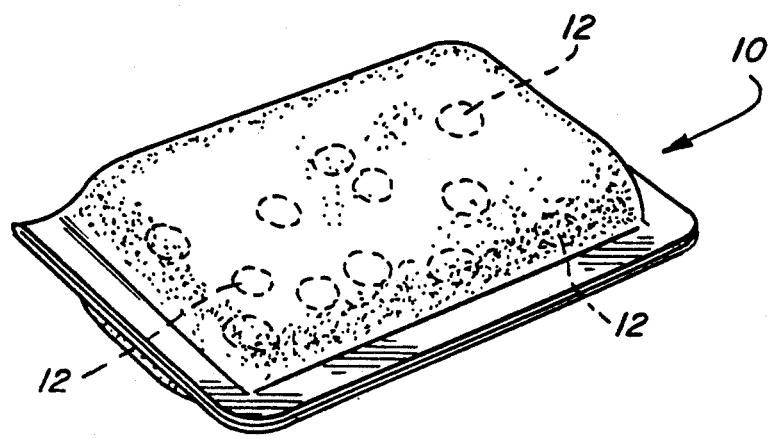
As illustrated in FIGS. 1 and 2, the pillow 10 contains an active solid material 12, such as molecular sieves or an immobilized reagent on a solid support such as glass beads. The pillow 10 is formed from folding over and heat sealing a flexible membrane material. The body of the pillow is fabricated from a solvent resistant material such as Teflon ®, polypropylene, or stainless steel.
Figure 2:
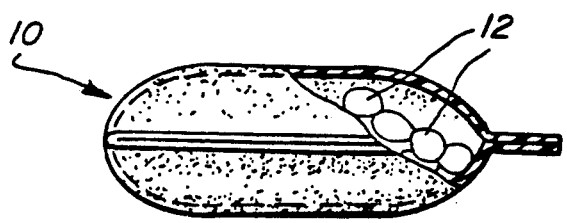
Figure 3:
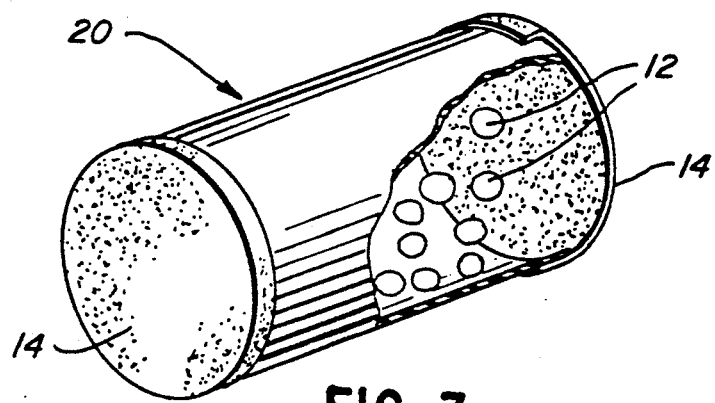
FIG. 3 shows a side view of a capsule with cylinder 20, membrane 14, and solid material 12. The membrane or filter material is also fabricated from a Teflon ® or polypropylene material.

The desiccant material of choice is a molecular sieve material with 3 anstrom pores. This material is commonly used for water removal from solvents, however, it is plagued with two problems 1) generation of high levels of harmful particulates and 2) variations in water removal ability unless the material is properly activated. The bag material of choice is polypropylene reinforced Teflon ® (polytetrafluoroethylene) with a 0.45 micron pore size. A membrane with a 0.2 micron pore size, however, works equally well. This bag effectively retains all particulates while allowing the solvent to come in contact with the desiccant material.

The method of choice for sealing the pillow or capsule is as follows. The pillow is fabricated by using a heat sealing process which effectively welds together adjacent layers of polypropylene along with the teflon membrane. Teflon ® (polytetrafluoroethylene) offers excellent solvent resistance, polypropylene offers very good solvent resistance, and indeed, offers little contamination to the solvent when the pillow is assembled according to our methodology.

EXAMPLES

The present invention is further illustrated by, but is by no means limited to, the following examples:

Example 1

Six Impurity Scavenger Pillows (ISP) were prepared by cutting Gelman membrane material (Product #4600000, Teflon ® (polytetrafluoroethylene) 450, 0.45 or 0.20 um pores) into rectangular pieces. The membrane was folded once, two edges sealed, molecular sieves added to the pouch formed, and then the third edge was sealed to form an impurity scavenger pillow.

The molecular sieves used were Union Carbide 1/16 inch pellets with 3 anstrom pores that had been regenerated in a muffle oven three hours at 300° C.

The pillows were then placed in liter bottles of high priority acetonitrile, some of which had water added to them, to test the water absorption abilities of the Impurity Scanventer Pillows.

Table 1 lists the percentage of water monitored by Karl Fischer Titration vs. the number of days since the Impurity Scavenger Pillow was placed in the bottle.

Bottles A and B with an initial low water content are kept low. Water content is decreased in bottles with a higher water content.

TABLE 1

Water Removal Using an ISC

| Bottle | Initial % Water | Sieve Weight (g) | Membrane Pore Size (microns) |
|---|---|---|---|
| A | 0.003 | no pillow | — |
| B | 0.002 | 4.6 | 0.45 |
| C | 0.030 | 4.6 | 0.45 |
| D | 0.056 | 4.6 | 0.45 |
| E | 0.054 | 9.2 | 0.45 |
| F | 0.055 | 4.6 | 0.45 |
| G | 0.055 | 4.6 | 0.20 |

Water Content (Percent) Residence Time in Bottles (Days)

| Bottle | 1 | 2 | 3 | 4 | 7 | 8 | 14 | 15 | 17 | 21 |
|---|---|---|---|---|---|---|---|---|---|---|
| A | .003 | .003 | .003 | .003 | | .004 | | .003 | | .002 |
| B | .002 | .002 | .003 | .002 | | .003 | | .002 | | .001 |
| C | .022 | .016 | .014 | .012 | | .009 | | .007 | | .006 |
| D | .040 | .030 | .026 | .023 | | .019 | | .017 | | .015 |
| E | .028 | .017 | .012 | .011 | | .007 | | .006 | | .005 |
| F | .029 | | | | .012 | | .011 | | .010 | |
| G | .027 | | | | .011 | | .008 | | .008 | |

Table 2 shows the ability of the pillow to control water content in a bottle which has repeatedly been left open for a while and then closed. Bottles A and B were opened at the same time, left open for the same number of hours, then closed. Bottle A, with no added Impurity Scavenger Pillow showed a steady increase in water content of over 200%. At the beginning of the experiment, an Impurity Scavenger Pillow as added to bottle B. This bottle showed no significant increase in water content over a period of nearly one month (Table 3).

Table 3 demonstrates the removal of water from another solvent, Tetrahydrofuran. In both cases, the water content steadily dropped during the duration of the experiment.

TABLE 2

Control of Water Level in Opened Bottles

| Bottle | Percent Water (Days) | | | | |
|---|---|---|---|---|---|
| | 1 | 7 | 1 | 18 | 34 |
| A (no pillow) | 0.012 | 0.017 | 0.022 | 0.044 | 0.044 |
| B (pillow added) | 0.007 | 0.005 | 0.005 | 0.009 | 0.007 |

TABLE 3

Water Removal from Tetrahydrofuran

| Bottle | Percent Water (Days) | | | |
|---|---|---|---|---|
| | 1 | 6 | 9 | 23 |
| A | 0.026 | 0.014 | 0.008 | 0.005 |
| B | 0.054 | 0.023 | 0.016 | 0.013 |

That which is claimed is:

1. A method for removing water, keeping water levels low or for removing chemical impurities from solvent fluid or reagent fluid, with minimal particulate or chemical contamination of said fluids, comprising:

(a) adding an impurity scavenger to said fluid, said impurity scavenger consisting essentially of a porous bag containing molecular sieves for adsorbing water and chemical impurities in said fluid, said porous bag having pores sufficiently small to retain fluid borne particulate generated within said bag and sufficiently large to allow fluid to flow into said bag, (b) adsorbing water and chemical impurities through said porous bag;

(c) retaining said adsorbed water and liquid chemical impurities in said molecular sieve.

2. An impurity scavenger pillow for removing water or keeping water levels low or for removing chemical impurities from solvent or reagent fluids, with minimal particulate contamination of said fluid by the pillow comprising:

(a) a pillow consisting essentially of a porous bag made by folding a sheet of polytetrafluoroethylene and sealing the open sides to enclose molecular sieves, said molecular sieves capable of adsorbing water and chemical impurities in said fluid, said porous bag having pores sufficiently small to retain liquid borne particulate generated within said bag and sufficiently large to allow fluid to flow in to said bag.

3. The pillow of claim 2 wherein said pores are between about 0.20 to 0.45 microns.

4. An article consisting essentially of:

a container containing reagent or solvent fluid, said container containing an impurity scavenger consisting of a porous bag containing molecular sieves for adsorbing water and chemical impurities in said fluid, said porous bag having pores sufficiently small to retain liquid borne particulate generated with said bag and sufficiently large to allow solvent to flow into said bag.

5. The article of claim 4 wherein said pores are between about 0.20 to 0.45 microns.

* * * * *